Nov. 1, 1966 H. H. LEMONJIAN 3,282,637
FILM VIEWER
Filed May 1, 1964
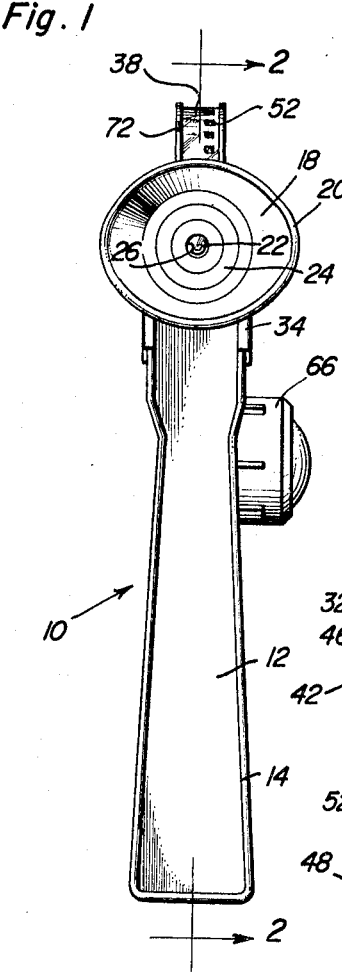
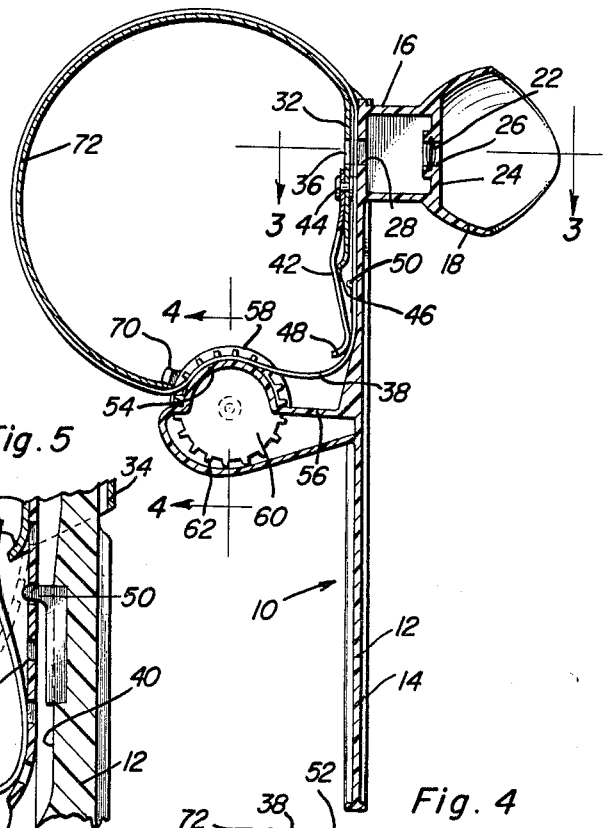
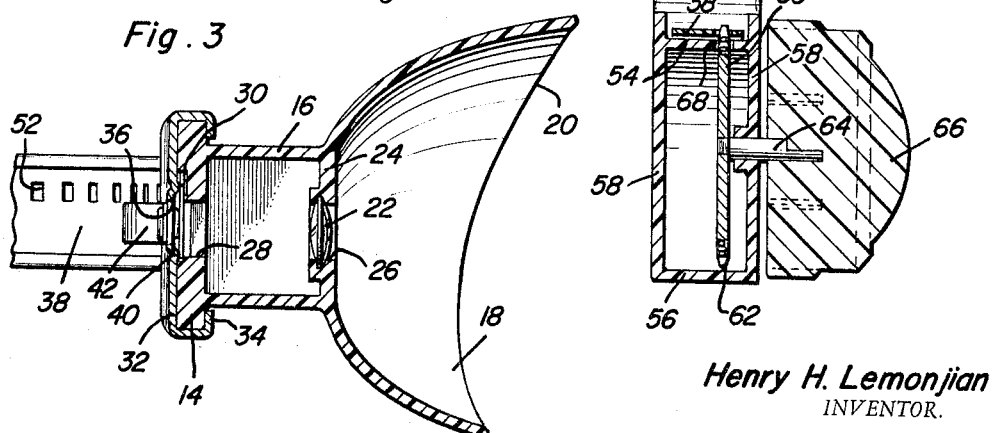
Henry H. Lemonjian
INVENTOR.

3,282,637
FILM VIEWER
Henry H. Lemonjian, 8904 65th Drive, Rego Park, N.Y.
Filed May 1, 1964, Ser. No. 364,086
3 Claims. (Cl. 352—129)

The present invention generally relates to a film viewer of the type adapted to be held in one hand and including an eyepiece for engaging one eye of a viewer together with a manual mechanism for advancing a film for viewing thereof.

An object of the present invention is to provide a film viewer that is adapted for use with a short film clip or the like and is primarily for the purpose of conveying certain information, scenes or the like to the viewer and has particular adaptation for use as a souvenir item or the like.

Another object of the present invention is to provide a film viewer adapted to be manually operated by rotating a knob for advancing the film strip one frame at a time to enable each frame of the film to be used.

Still another object of the present invention is to provide a film viewer having a novel guide mechanism for the film strip associated therewith.

Still another important feature of the present invention is to provide a film viewer which is hand held and includes an eyepiece for one eye together with a viewing lens associated with apertures over which the film passes for enabling viewing of the film when the eyepiece is engaged with the eye and the apertures are directed toward a source of artificial or natural light.

Yet another important object of the present invention is to provide a film viewer which is simple in construction, easy to use, relatively inexpensive to manufacture, easy to operate and adaptable for use as a souvenir item or the like.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational view of the film viewer of the present invention;

FIGURE 2 is a vertical sectional view taken substantially upon a plane passing along section line 2—2 of FIGURE 1 illustrating the structural details of the invention;

FIGURE 3 is a transverse, sectional view taken substantially upon a plane passing along section line 3—3 of FIGURE 2 illustrating the construction of the eyepiece, lens and associated structure;

FIGURE 4 is a detailed sectional view taken substantially upon a plane passing along section line 4—4 of FIGURE 1 illustrating the knob mechanism and the drive for the film strip;

FIGURE 5 is a fragmental view of the film strip movement limiting lug.

Referring now specifically to the drawings, the numeral 10 generally designates the film viewer of the present invention which includes an elongated one-piece plastic handle 12 having peripheral edge ribs 14 for facilitating the gripping thereof. The upper end of the handle which is generally of the same dimension throughout its length is provided with a lateral hollow projection 16 which terminates in an outwardly flared eyepiece 18 that has a curved terminal edge 20 defining an ovate structure for engaging the surface of the head in peripheral relationship to the eye so that the eye may see through a lens 22 mounted centrally in a partition 24 forming the inner dimension of the eyepiece 18. The lens 22 is orientated in an opening 26 and may be of any suitable construction and preferably of a relatively inexpensive construction such as plastic material or the like. The other end of the hollow housing is provided with an opening 28 aligned with the lens 22 and the surface of the handle 12 at the upper end thereof is provided with a longitudinal groove 30 with which the aperture 28 communicates.

Slidably mounted on the upper end of the handle 12 is a channel-shaped member 32 having inturned flanges 34 slidably engaging around the edges of the handle 12 and the channel-shaped member 32 is also provided with an aperture 36 in alignment with the aperture 28 and the lens 22. The bight portion of the channel-shaped member 32 forms a closure for the groove 30 thus forming a guide for a film strip 38. Also, the bight portion of the channel-shaped member 32 which may be constructed of metal is provided with a pair of longitudinal ribs 40 deformed inwardly to engage and retain the film strip in position against the bottom of the groove 30. Attached to the outer surface of the bight portion of the channel-shaped member 32 is a leaf spring 42 attached to the outer surface of the channel-shaped member 40 by a rivet 44 between the ribs 40. The leaf spring 42 extends downwardly and is slightly outwardly offset to pass over an outwardly extending lower edge 46 on the bight portion of the channel-shaped member and the leaf spring 42 terminates in an outwardly curved terminal end 48 to form a guide for the film strip 38. The bottom portion of the groove 30 is provided with a projecting lug 50 for engagement with one of the apertures 52 along one side of the film strip 38 with the spring 42 serving to enable the projection 50 to be engaged with and disengaged from the aperture 52. When the film strip 38 is pulled downwardly and outwardly, the spring 42 will flex thus enabling it to be released from the projection 50 for longitudinal movement.

For moving the film strip 38, there is provided a convex guide 54 supported by a laterally extending bracket 56 which is hollow in configuration and which is integral with the handle 12. The bracket 56 has circular guide plates 58 integral therewith which are also integral with the convex guide surface 54 thus defining a hollow bracket which rotatably receives a drive disk 60 having a plurality of peripherally disposed projections 62 for driving engagement with the apertures 52 along one edge of the film strip 38. The drive wheel 60 is mounted on a shaft 64 journalled in one of the side plates 58 with a plastic knob 66 being secured to the outer end of the shaft 58 for rotation thereof. As illustrated, the guide surface 54 is disposed inwardly of the periphery of the drive wheel 60 which extends through an arcuate slot 68 formed in the guide surface 54 so that when the film strip 38 engages the guide surface 54, the projecting piece 62 on the drive wheel 60 will engage the apertures 52 and the film strip 38. Also, a guide lug 70 is provided adjacent the outer end of the slot 68 for assuring that the film strip will be retained in arcuate configuration around the outer periphery of the arcuate guide 54 so that by rotation of the knob 66, the film strip will be advanced.

An elongated arcuate guide 72 is provided which extends from the transverse guide bar 70 arcuately upwardly and back into the entrance area between the upper edge of the channel-shaped member 32 and the upper end of the handle 12 with the arcuate guide 72 being channel-shaped in cross-sectional configuration and integral with the channel-shaped member 32 and the guide strip may be constructed of metal or plastic material and detachably engaged with the lug 70 which extends only partially across the width of the film strip to enable the film strip to be detached from the guide surface 54 or associated therewith when desired so that the film strip may be assembled or disassembled from the viewer.

The present invention may be constructed of a size to receive 8 mm. film, 16 mm. film or 35 mm. film and the structure of the drive wheel 60 and the spring 68 together with the projection 50 forms, in effect, an advance mechanism which will provide somewhat of a ratcheting effect as the knob is rotated. Assuming that the structure is in the position illustrated in FIGURE 2, upon rotation of the knob 66 in a clockwise manner, the portion of the film strip 38 between the drive wheel 60 and the spring 42 will be moved thus flexing the flat leaf spring 42 away from the handle 12. This then enables the film strip 38 to move away from the projecting lug 50 that is disposed alongside of the spring below the channel-shaped member 32. As soon as the film strip moves away from the lug, it will rapidly advance inasmuch as the spring 42 is endeavoring to return to its position adjacent the handle. Thus, the spring will cause the film strip to reengage with the lug 50 as soon as it has moved one frame or the distance of one notch or aperture in the film strip inasmuch as the spring will cause the next aperture in the film strip to engage with the projection 50. Thus, by rotating the knob rapidly, the film strip may be moved rapidly thus giving the impression of a moving picture. However, by rotating the knob in a clockwise but slow manner, the film strip may be advanced frame by frame for enabling observation of each frame.

The viewing device is held in the hand with the eyepiece against the surface of the eye or adjacent thereto and the device is aimed generally at a source of artificial or natural light so that the picture on the film strip will be readily observed and by rotating the knob, the film strip may be advanced in the manner set forth hereinbefore. By making the handle and eyepiece as well as the bracket of one piece of plastic material, the construction cost of the invention may be retained at a minimum.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A film viewer comprising an elongated handle having a laterally extending eyepiece on one end thereof for positioning in adjacent relation to the eye of a viewer for enabling the eyepiece to be manually held in place, said eyepiece including a viewing lens incorporated therein, guide means on the handle for guiding a film strip past the lens, said handle including aperture means incorporated therein in alignment with the viewing lens for enabling the film strip to be observed by holding the eyepiece adjacent the eye and aiming the lens toward a source of light, means attached to said handle for advancing said film strip, and arcuate guide means for guiding the film strip from the handle to the strip advancing means, said means for advancing the film strip including a drive wheel having a plurality of projections thereon for engaging holes disposed along the side edge of the film strip, a convex guide surface for the film strip, said wheel being disposed under said convex surface and projecting through an arcuate slot therein so that the projections on the drive wheel may engage the holes in the film strip.

2. The structure as defined in claim 1 wherein said guide means on the handle for guiding the film strip includes a groove in the handle, a member forming a closure for the groove for retaining the film strip therein, a leaf spring attached to said closure member and extending downwardly therefrom to a position adjacent the convex guide surface for the film strip as it engages the drive wheel, a projection on said handle engageable with the holes in the film strip with the projection being disposed alongside of the lower end of the leaf spring whereby the leaf spring will normally retain the film strip engaged with the projection but enabling it to move outwardly away from the projection for advance of the film strip until the next hole therein is engaged over the projection thereby providing step-by-step advance of the film strip.

3. The structure as defined in claim 2 wherein said arcuate guide means includes an arcuate member extending from one end of the handle in continuation with the guide means therealong to the convex guide surface for the film strip.

References Cited by the Examiner
UNITED STATES PATENTS 2,490,920 12/1949 Roisman _____ 352—129
2,520,410 8/1950 Jelinek _____ 352—126 X JULIA E. COINER, *Primary Examiner.*